United States Patent [19]

Schmidt et al.

[11] 4,193,912

[45] Mar. 18, 1980

[54] PREPARATION OF HIGH-VISCOSITY MIXTURES CONTAINING THERMOPLASTIC POLYESTERS

[75] Inventors: Werner Schmidt, St. Augustin; Rüdeger Minke, Troisdorf-Sieglar, both of Fed. Rep. of Germany

[73] Assignee: Dynamit Nobel Aktiengesellschaft, Troisdorf, Fed. Rep. of Germany

[21] Appl. No.: 907,638

[22] Filed: May 19, 1978

[30] Foreign Application Priority Data

May 28, 1977 [DE] Fed. Rep. of Germany ....... 2724411

[51] Int. Cl.$^2$ .............................................. C08K 3/22
[52] U.S. Cl. ............................ 260/45.75 B; 528/285
[58] Field of Search ................... 260/45.75 B; 528/285

[56] References Cited

U.S. PATENT DOCUMENTS

| | | | |
|---|---|---|---|
| 3,171,828 | 3/1965 | Isaacs et al. | 260/75 |
| 3,193,522 | 7/1965 | Neumann et al. | 260/45.9 DI |
| 3,751,396 | 8/1973 | Gall | 260/45.75 B |
| 3,816,377 | 6/1974 | Okuzumi | 260/75 T |

*Primary Examiner*—V. P. Hoke
*Attorney, Agent, or Firm*—Sprung, Felfe, Horn, Lynch & Kramer

[57] ABSTRACT

An improvement in a process for preparing an antimony oxide stabilized polymethylene terephthalate polymeric composition wherein polymethylene terephthalate is produced by polycondensing a polymethylene terephthalate precondensate, the improvement residing in compounding said precondensate with said antimony oxide and thereafter subjecting the resultant composition to solid phase polycondensation. In particular is described a process for the stabilization of high molecular weight (high viscosity) polymethylene terephthalate wherein together with the antimony oxide there is added a stabilizer or other additive to the precondensate and the resultant composition is subjected to solid phase polycondensation. Also described are the resultant products of such processes.

10 Claims, No Drawings

PREPARATION OF HIGH-VISCOSITY MIXTURES CONTAINING THERMOPLASTIC POLYESTERS

BACKGROUND OF THE INVENTION

1. Field of the Invention

This invention relates to a process for the preparation of polymethylene terephthalate of high viscosity. More specially, this invention relates to the preparation of high viscosity polymethylene terephthalate containing antimony oxide alone or in admixture with another additive, especially a fire retardant agent. This invention is further directed to the preparation of a high molecular weight (high viscosity) polymethylene terephthalate, which can be readily formed into final objects by injection molding and which has not undergone unnecessary thermal degradation processes.

2. Discussion of the Prior Art

Among the more recent thermoplastics, the thermoplastic polyesters have rapidly gained a large share of the market. Particularly polytetramethylene terephthalate (PTMT), on account of its easy working qualities and its good mechanical and electrical properties, has become a popular material, especially for fabrication by the injection molding process. For many purposes, however, especially in the electrical industry, but also in the automotive industry and in the manufacture of machine parts, a fire-retardant material is needed, and such material is also being offered on the market.

PTMT is treated for fire-retardancy almost exclusively with organic compounds such as brominated aromatics and others which are mixed with the polyester in the solid state and are incorporated and blended in as finely and uniformly as possible by melting and working in a kneader or extruding machine. Usually a strand is extruded from this fused mixture and is chopped into granules and marketed in this form. To improve the flame-retardant action of these brominated additives, so that the amount that is used can be kept within economically acceptable limits, it is common to incorporate into the PTMT together with the flame-retardant agents, synergistically acting additives such as antimony compounds, boron or zinc compounds and the like, although of these only antimony trioxide is of practical importance.

Although material of good flame-retardancy can be obtained by the above-described method, the process is nevertheless problematical for other reasons. The additives affect not only the combustibility of PTMT but also its other properties. In particular, they impair its mechanical characteristics, such as elongation at rupture, impact and notch impact strength, i.e., they produce brittleness. It is known that the mechanical characteristics of substances of high molecular weight such as PTMT depend on their molecular weight, which is measured on the basis of their solution viscosity. The higher the molecular weight and hence the solution viscosity is, the better are the mechanical properties; the lower the solution viscosity is, the more brittle and fragile the material becomes. Since the PTMT is made more brittle by the addition of fire-retardant agents and synergistic materials, it has hitherto been the practice to counter this undesirable effect by using a PTMT of the highest possible viscosity. This, however, is severely limited by practical and economical considerations. In the present state of the art, high viscosities are not achieved immediately in the production of the PTMT by polycondensation, but afterwards, by an additional procedure. In this procedure the granules of commonly low viscosity are cured for many hours at elevated temperature and reduced pressure, until at last the desired viscosity is achieved by this "solid-phase condensation", as it is called. In order to achieve a fire-retardant PTMT of useful mechanical properties, it is necessary to use as starting material a PTMT which has been cured to reduced viscosity ($\eta_{red}$) values of approximately 1.6 dl/g or more, which involves a considerable expenditure of time and energy.

SUMMARY OF THE INVENTION

In accordance with the present invention, an antimony oxide stabilized high viscosity polymethylene terephthalate can be produced much more rapidly than by the aforementioned prior art techniques by compounding a polymethylene terephthalate precondensate with such antimony oxide alone or in admixture with another additive, e.g., a fire-retardant agent and subjecting the resultant composition to polycondensation.

Thus, the present invention proceeds by combining antimony trioxide and, in particular, another additive such as a fire retardant agent with a polytetramethylene terephthalate of low molecular weight. Only then is the granulated composition then subjected to solid phase polycondensation (curing). It has been discovered, for example, that if 15 or more hours are required to achieve a reduced viscosity of, for example, 1.6 dl/g in a pure polytetramethylene terephthalate, this can be accomplished by the compounding procedure described above with only 10 hours or less under the same conditions. Moreover, the polytetramethylene terephthalate (PTMT) is provided with discoloration of the material or other degradation.

As a result, a wide variety of fire-retardant substances can be included the PTMT composition along with the antimony trioxide. The same surprising beneficial effect is also observed in PTMT which has not been treated for fire-retardancy if the antimony trioxide is present as a component in the composition to be subjected to polycondensation.

In carrying out the process of the invention, the polytetramethylene terephthalate precondensate is combined with the antimony trioxide and any desired conventional additive such as a stabilizer, filler, lubricant, smoke-inhibiting agent, fabricating adjuvant or the like and the resultant composition is subject to solid phase condensation until a high viscosity polymethylene terephthalate is produced. Generally speaking, the polycondensation is effected until the polymer has a reduced viscosity of at least 1,2 dl/g. Preferably, the polycondensation is effected so that the resultant polymer has a reduced viscosity in the range of >1,2 to 2,5 dl/g, preferably 1,3 to 2,1 dl/g.

It is known that antimony trioxide can act as a polycondensation catalyst in the preparation of polyesters. This action, however, has hitherto only been used in the liquid phase, the antimony as a rule being dissolved as an alcoholate or glycolate. Antimony trioxide, however, is used hardly any longer for this purpose, because it is known that it is a sluggish catalyst and substantially more active catalysts are available, such as, for example, titanates, especially butyl titanate. In the preparation of PTMT from dimethylterephthalate and butanediol, the use of antimony trioxide is being entirely avoided, because in this case still another catalyst such as zinc acetate, for example, is needed for the purpose of the transesterification. If, after the transesterification, this catalyst is rendered harmless by reducing agents such as phosphites, for example, there results an immediate discoloration of the entire batch. All these difficulties vanish when the solid phase curing is performed in the presence of the antimony trioxide additive used in accordance with the invention. Unaltered, colorless granules of the desired high viscosity are obtained in an economical manner, which can then be directly injection molded to form articles of correspondingly good characteristics.

If pure PTMT made by the conventional method is cured to increase its viscosity, it has to be remelted and put through a kneader or extruder for the incorporation of additives. Not until then can the granules thus produced be fabricated thermoplastically. The cured PTMT is thus twice subjected to thermal stress. It is known, however, that PTMT of especially high molecular weight is slightly degraded each time that it is subjected to thermal stress, so that the reduced viscosity is more severely lowered by the twofold thermal stress imposed on the PTMT by the conventional method than it is by the method of the invention. In the latter method, the low-molecular-weight composition is adjusted to the desired high viscosity, and then it needs only to be subjected to the final thermoplastic fabricating operation, such as injection molding. It had formerly been necessary to compensate for the greater degradation produced in the conventional method by continuing the solid-phase condensation to a correspondingly higher value. Such is not necessary in the procedure of the invention, which, as a result, provides substantial savings.

The reactive precondensates used in accordance with the invention are prepared in a known manner, preferably by the transesterification of a dialkyl or diaryl ester of terephthalic acid—especially dimethyl terephthalate—with butanediol-1,4, followed by condensation in the presence of suitable catalysts. The term PTMT, as used herein, is to be understood to include also those polyesters in which a portion of the butanediol-1,4 is replaced in an amount equal to or less than 50 weight-percent by one or more other diols and/or those in which a part of the terephthalic acid or its ester is replaced in an amount equal to or less than 50 weight-percent by one or more other dicarboxylic acids.

Examples of such comonomers are aliphatic, cycloaliphatic or aromatic dicarboxylic acids such as adipic acid, azelaic acid, sebacic acid, dodecane diacid, cyclohexanedicarboxylic acid or isophthalic acid. Modifying diols are those having two to ten carbon atoms, such as ethylene glycol, isomers of propylene glycol or of butylene glycol, neopentyl glycol and the like. Unsaturated comonomers also come under consideration.

Preferred are homopolyesters on the basis of terephthalic acid, especially on the basis of dimethylterephthalate, and butanediol-1,4.

For example, dimethylterephthalate and butanediol-1,4 in a molar ratio of 1:1.1 to 1:1.5, preferably of 1:1.2 to 1:1.4, plus a catalyst, especially butyl titanate or tetraoctylene glycol titanate, are transesterified in a kettle at standard pressure in the temperature range from 150° to 180° C. until the rate of methanol distillation abates. To start the condensation, the material is forced over into a second kettle and the excess diol is driven off at a still higher temperature, until the desired degree of condensation is achieved. In the preparation of copolyesters the procedure is analogous.

The precondensates thus obtained, which are used in accordance with the invention, are distinguished by their reduced viscosity, which is generally from 0.4 to 1.2, preferably 0.6 to about 1.0.

The reduced viscosity is computed according to the following formula:

$\eta_{red} = (\eta/\eta_o - 1) \cdot 1/c$, $\eta_o$ being the viscosity of the solvent (60 weight-parts of phenol + 40 weight-parts of 1,1,2,2-tetrachloroethane), $\eta$ the viscosity of the solution, and c the concentration of the solution (1 g/100 ccm$^3$), measured at 25° C.

The compositions to be subjected to curing in accordance with the invention can contain, in addition to antimony trioxide or in addition to antimony trioxide and a fire-retardant agent, conventional additives, such as fabricating adjuvants such as lubricants, or other additives such as smoke inhibiting agents—e.g., molybdenum compounds—or stabilizers, fillers or the like, individually or in mixtures, in conventional amounts. Plastics which are compatible with PTMT polyesters or copolyesters can also be provided as additives (to cut the PTMT polyesters or copolyesters).

With respect to the additives which can be included in the composition it is particularly contemplated to combine the polycondensate and antimony trioxide with an inert filler such as CaCO$_3$, MgCO$_3$ and mineral fillers comprising silica or a metallic silicate, e.g. Mg-Al-silicates like salium, kaolin, mica. Alternatively, fabricating adjuvants such as lubricants e.g. siliconoils, salts of long-chained carbonic acids can be included in the precondensate-antimony trioxide composition. Stabilizers can be added to the precondensate. Preferably they are added to the polycondensate. Fire retardant agents are preferably added to the precondensate.

Stabilizers which can be included in the precondensate-antimony trioxide composition include the following types:
Carbodiimide (type Stabaxol, Bayer),
pentaerythrite-propion-ester (type Orgauox, Geigy),
phenole, kaesole (type Tonole, Shell),
bis-phenole (type Topanol, ICI).

In a procedure that is preferred in accordance with the invention, the compositions to be cured contain the antimony trioxide in an amount of from 1 to 12 weight-percent, preferably 3 to 8 weight-percent. In another preferred procedure, the compositions to be cured contain a fire-retardant agent in addition to the antimony trioxide, preferably an aromatic bromine compound, such as tetrabromo-p-xylyleneglycol polyformal, tetrabromo-p-xylyleneglycol polyacrylate, or a polyester of terephthalic acid and isophthalic acid (1:1) with tetrabromodiane, and the like see U.S. application, Ser. No. 681,672 filed Apr. 29, 1976, entitled Polymeric and Oligomeric Formals; U.S. application, Ser. No. 697,190 filed June 17, 1976, entitled Acrylate-Based Polymers and Copolymers and Their Use As Flameproofing Agents; both assigned to the assignee hereof, as well as German Offenlegungsschrift No. 26 01 961, the disclosures of which are hereby incorporated herein by reference.

The amount of fire-retardant agents contained in the compositions to be cured should be from 5 to 18, and preferably 8 to 12, percent by weight. The compounding can be performed in the plastic or molten state in mixers commonly used in the compounding of thermoplastics with additives, preferably in extruders. The temperatures are to be selected so as to assure a thorough mixing together of the components.

Generally speaking, the antimony trioxide and other additive is worked into the precondensate so as to form a homogeneous mixture. Generally speaking, the compounding of the antimony trioxide and additive with the precondensate is effective at a temperature between 200° and 280° C. preferably between 230° and 260° C. Generally speaking, atmospheric pressure is employed although superatmospheric and subatmospheric pressures can be utilized during the compounding procedure. Generally speaking, the compounding of the precondensate with the antimony trioxide an additive is effected at a temperature below the melting point of the precondensate. Thus, in the compounding of a polytetrmethylene terephthalate precondensate having a reduced viscosity of 0.95 dl/g in an extruder, the temperature schedule is approximately as follows: Zone 1 (entry zone) 220° C., Zone 2 240° C., Zone 3 250° C., Zone 4 250° C., Zone 5 250° C., Zone 6 (die) 230° C. According to the softening points of the polyesters used in accordance with the invention, the temperatures in the mixing apparatus can be lower than 220° C. or also higher than 250° C.-280° C. for example—depending on requirements.

In the solid phase postcondensation, the procedure described in German Offenlegungsschrift No. 23 15 272, the disclosure of which is hereby specified. For example the precondensate composition containing the additives are cut into granules as they emerge from the screw-type mixing unit, and are then further comminuted if desired. The granules or particles should be as uniform as possible for the solid-phase condensation, so that the condensation can take place in a uniform manner. The solid-phase condensation is performed at elevated temperatures, but below the melting point of the crystalline components of the polymer, preferably at about 5° to 60° C. below the melting point of the precondensate, in suitable reactors, e.g., in a tumble dryer, rotary kiln, screw conveyor, plate dryer, vibrating dryer or fluidized bed dryer maintained at the reaction temperature. However, the solid-phase curing can be accomplished also in a still bed.

With respect to the polycondensation conditions, generally speaking, the precondensate-antimony trioxide composition is heated at a temperature between 170° and 230° C. preferably between 200° and 220° C. under subatmospheric or superatmospheric pressures, atmospheric pressure being preferred. The polycondensation can be effected in the presence of catalyst employed for the precondensation. Additional catalyst can be added, if desired. Preferred pressures are 10–0,1 torr.

It is desirable to perform the solid-phase condensation in a dry stream of inert gas or preferable in vacuo. If desired, precondensate compositions in the form of endless strips or strands can be subjected to the solid-phase condensation instead of granules or powders. In order to more fully illustrate the nature of the invention and the manner of practicing the same, the following examples are presented:

EXAMPLES

In the following examples, "parts" are to be understood as parts by weight.

EXAMPLE 1

(a) A precondensate prepared in a conventional manner, having a reduced viscosity of 0.99 dl/g, is cured at 200° C. and 1 Torr in a vacuum drying oven, in a depth of 2 cm. The following viscosity increase is achieved:

after 5 h—$\eta_{red}$ 1.22 dl/g
after 10 h—$\eta_{red}$ 1.43 dl/g
after 15 h—$\eta_{red}$ 1.56 dl/g (b) By means of an extruder, a mixture of 86 parts of precondensate, 10 parts of tetrabromo-p-xylylene glycol polyformal and 4 parts of antimony trioxide are melted and pressed to form a strand which is then chopped into granules. This composition is subjected to curing as in (a). The viscosity increases obtained are as follows:

after 5 h—$\eta_{red}$ 1.26 dl/g
after 10 h—$\eta_{red}$ 1.57 dl/g
after 15 h—$\eta_{red}$ 1.81 dl/g (c) The procedure is the same as in (b), but the brominous component serving as fire-retardant is omitted, so that the composition consists of 96 parts of PTMT precondensate and 4 parts of antimony trioxide. In the post-condensation, the following viscosity increase is achieved:

after 5 h—$\eta_{red}$ 1.29 dl/g
after 10 h—$\eta_{red}$ 1.61 dl/g
after 15 h—$\eta_{red}$ 1.87 dl/g

EXAMPLE 2

A PTMT precondensate of a reduced viscosity of 0.93 dl/g is cured in a depth of 2 cm in a vacuum drying oven at 212° C. and 1 Torr. The viscosity attains the value of $\eta_{red}$ 1.57 dl/g.

86 parts of the same precondensate are compounded with 10 parts of tetrabromo-p-xylyleneglycol polyacrylate and 4 parts of antimony trioxide, and extruded and chopped into granules. The granules are cured under the same conditions as the precondensate. The viscosity obtained achieves a value of $\eta_{red}$ 2.01 dl/g.

EXAMPLE 3

A PTMT precondensate of a reduced viscosity of 0.97 dl/g is cured as above, but at 200° C. and 1 Torr. The viscosities achieved are as follows:

after 5 h—$\eta_{red}$ 1.27 dl/g
after 2×5 h—$\eta_{red}$ 1.43 dl/g
after 3×5 h—$\eta_{red}$ 1.56 dl/g For comparison, a composition of 86 parts of the same precondensate, 10 parts of a polyester of terephthalic acid and isophthalic acid (1:1) with tetrabromodiane, and 4 parts of antimony trioxide is prepared by means of an extruder and the granules are cured as above. The viscosities achieved are as follows:

after 5 h—$\eta_{red}$ 1.53 dl/g
after 2×5 h—$\eta_{red}$ 1.78 dl/g
after 3×5 h—$\eta_{red}$ 1.91 dl/g.

What is claimed is:

1. A process for preparing an antimony oxide stabilized polymethylene terephthalate polymeric composition which comprises compounding a polymethylene terephthalate precondensate having a reduced viscosity in the range of 0.4 to 1.2 dl/g with said antimony oxide and thereafter subjecting the resultant composition to solid phase polycondensation until the resultant polycondensate has a reduced viscosity in the range of 1.3 to 2.5 dl/g the antimony trioxide concentration being 1 to 12 weight percent based on the weight of said precondensate.

2. A process according to claim 15 wherein said precondensate has a reduced viscosity in the range of 0.6 to 1.0 dl/g.

3. A process according to claim 1 wherein said precondensate is compounded with said antimony oxide and another additive.

4. A process according to claim 3 wherein said other additive is a stabilizer filler, lubricant, smoke-inhibiting agent or fabricating adjuvant.

5. A process according to claim 4 wherein said other additive is a fire retardant stabilizer.

6. A process according to claim 5 wherein said stabilizer is an aromatic bromine compound.

7. A process according to claim 1 wherein said antimony oxide is added to said precondensate in an amount of 3 to 8 weight percent based upon the weight of said precondensate.

8. A process according to claim 5 wherein said other additive is added in an amount of 5 to 18 weight percent.

9. A process according to claim 5 wherein said other additive is added in an amount of 8 to 12 weight percent.

10. A polymer produced by the process of claim 1.

* * * * *

UNITED STATES PATENT AND TRADEMARK OFFICE
CERTIFICATE OF CORRECTION

PATENT NO. : 4,193,912
DATED : March 18, 1980
INVENTOR(S) : WERNER SCHMIDT and Rüdeger Minke It is certified that error appears in the above-identified patent and that said Letters Patent are hereby corrected as shown below:

Column 6, line 66, change "15" to --1--.

Signed and Sealed this

Twenty-ninth Day of July 1980

[SEAL]

Attest:

SIDNEY A. DIAMOND

Attesting Officer     Commissioner of Patents and Trademarks